UNITED STATES PATENT OFFICE.

FRANZ FLAECHER, OF HÖCHST-ON-THE-MAIN, GERMANY, ASSIGNOR TO H. A. METZ & CO., OF NEW YORK, N. Y., A CORPORATION OF NEW YORK.

HYDROCHLORID OF ORTHODIOXY-PHENYL-ETHANOL-METHYLAMIN IN A CRYSTALLIZED FORM.

1,002,909. Specification of Letters Patent. Patented Sept. 12, 1911.

No Drawing. Application filed April 17, 1908. Serial No. 427,674. (Specimens.)

*To all whom it may concern:*

Be it known that I, FRANZ FLAECHER, Ph. D., chemist, citizen of the Empire of Germany, and residing at Höchst-on-the-Main, Germany, have invented certain new and useful Improvements in the Manufacture of the Hydrochlorid of Orthodioxy-Phenyl-Ethanol-Methylamin in a Crystallized Form, of which the following is a specification.

All experiments to obtain crystallized salts of orthodioxy-phenyl-ethanolmethylamin which is in the market under the name of "Suprarenine" or "Adrenaline," have hitherto been unsuccessful (compare f. i. J. Takamine, *Chemisches Centralblatt* 1901, II. S. 1354). The base itself is insoluble, therefore it has been brought on the market in a hydrochloric solution. This solution had however the disadvantage that it was relatively unstable and that it could be used only if preservative agents were added. A salt of the orthodioxy-phenyl-ethanolmethylamin, being entirely stable in air, crystallizing and readily and neutrally soluble in water, would be of great therapeutical value.

I have now found that the hydrochlorid of the base will be obtained in nice crystals and in a good yield, if synthetic orthodioxy-phenyl-ethanolmethylamin (compare Patent No. 930,703) is treated with alcoholic hydrochloric acid.

Example: One molecule of orthodioxy-phenyl-ethanolmethylamin is moistened thoroughly with some quantity of absolute alcohol and dissolved in the theoretically required quantity of alcoholic hydrochloric acid. For instance, 183 gr. (1 molecule) of orthodioxy-phenyl-ethanol-methylamin are moistened with some alcohol and then dissolved in one molecule = 146 gr. of 25 per cent. absolute alcoholic hydrochloric acid. The reaction involved corresponds to the formula:

After a short time, especially after frequent stirring with the glass-rod, the liquid crystallizes. The crystals are filtered, washed with absolute alcohol and ether and recrystallized from alcohol. The crystals are in the form of rhombic prisms.

The hydrochlorid of orthodioxy-phenyl-ethanolmethylamin obtained thereby is colorless, readily soluble in water with neutral reaction and difficulty soluble in absolute alcohol. It melts at 161° C., and is optically inactive.

Having now described my invention, what I claim is:

1. The process for the manufacture of hydrochlorid of orthodioxy-phenyl-ethanolmethylamin in a crystallized form, which consists in treating the optically inactive base with alcoholic hydrochloric acid and allowing it to crystallize.

2. The herein described process of producing in crystallized form an optically inactive substance having the astringent and hemostatic properties of the suprarenal glands, consisting in moistening an optically inactive base of said substance thoroughly with absolute alcohol, dissolving the same in alcoholic hydrochloric acid, and allowing it to crystallize.

3. As a new product an optically-inactive substance possessing the astringent and hemostatic properties of the suprarenal gland, consisting of colorless crystals, stable in air, readily soluble in water with a neutral reaction, difficultly soluble in absolute alcohol, and having a melting point at 161 degrees C.

4. As a new product, the crystallized hydrochlorid of ortho-dioxyphenylethanol-methylamin in the form of rhombic prisms, which are stable in air, colorless, readily soluble in water with neutral reaction, difficultly soluble in absolute alcohol, having a melting point of 161 degrees C., and the aqueous solution of the salt being optically inactive.

In testimony, that I claim the foregoing as my invention, I have signed my name in presence of two subscribing witnesses.

FRANZ FLAECHER.

Witnesses:
JEAN GRUND,
CARL GRUND.